(12) United States Patent
Kubo et al.

(10) Patent No.: US 6,796,580 B1
(45) Date of Patent: Sep. 28, 2004

(54) GAS GENERATOR FOR ACTUATING VEHICLE PASSENGER CONSTRAINER

(75) Inventors: Dairi Kubo, Himeji (JP); Junya Amano, Himeji (JP); Koji Nakamura, Himeji (JP); Kenjiro Ikeda, Himeji (JP)

(73) Assignee: Nippon Kayaku Kabushiki-Kaisha, Tokyo (JP)

( * ) Notice: Subject to any disclaimer, the term of this patent is extended or adjusted under 35 U.S.C. 154(b) by 0 days.

(21) Appl. No.: 10/049,622
(22) PCT Filed: Aug. 23, 1999
(86) PCT No.: PCT/JP99/04516
§ 371 (c)(1), (2), (4) Date: Feb. 22, 2002
(87) PCT Pub. No.: WO01/14173
PCT Pub. Date: Mar. 1, 2001

(51) Int. Cl.$^7$ ............................................ B60R 21/26
(52) U.S. Cl. .................... 280/741; 102/531; 102/202.14
(58) Field of Search ................................. 280/741, 736; 102/530, 531, 202.14

(56) References Cited

U.S. PATENT DOCUMENTS

| | | | | |
|---|---|---|---|---|
| 4,734,265 A | * | 3/1988 | Nilsson et al. ............... | 280/741 |
| 4,890,860 A | * | 1/1990 | Schneiter ..................... | 280/741 |
| 5,062,367 A | * | 11/1991 | Hayashi et al. .............. | 280/741 |
| 5,104,466 A | * | 4/1992 | Allard et al. ................ | 280/741 |
| 5,634,660 A | * | 6/1997 | Fink et al. ................... | 280/741 |
| 5,648,634 A | * | 7/1997 | Avory et al. ............ | 102/202.14 |
| 6,474,684 B1 | * | 11/2002 | Ludwig et al. .............. | 280/741 |

FOREIGN PATENT DOCUMENTS

| | | |
|---|---|---|
| JP | 2-155858 | 6/1990 |
| JP | 2-155860 | 6/1990 |
| JP | 10-262 | 11/1998 |

* cited by examiner

Primary Examiner—Peter C. English
(74) Attorney, Agent, or Firm—Oblon, Spivak, McClelland, Maier & Neustadt, P.C.

(57) ABSTRACT

A gas generator for actuating a vehicle occupant restraint device, including a first hollow body with a bottom and sides, gas generants filled densely in the first hollow body, an electric ignitor formed by housing igniting agents in a second hollow body with a bottom and sides, and closing the second hollow body with a plug, and a holder positioning the second hollow body in a center of the first hollow body and fixing the first hollow body while holding the plug of the electric ignitor. Particularly, a ratio of an empty space to a full volume of a space partitioned by an inner surface of the first hollow body, an outer surface of the second hollow body, and the holder is less than 20% by volume.

5 Claims, 3 Drawing Sheets

Fig. 3

| | Example 1 | Example 2 | Example 3 | Example 4 | Comparative Example 1 |
|---|---|---|---|---|---|
| Ratio of the empty space by volume [%] | 8.3 | 17.8 | 10.0 | 7.4 | 27.4 |
| Ignition delay period [ms] | 1.7 | 1.8 | 1.7 | 1.8 | 2.4 |

GAS GENERATOR FOR ACTUATING VEHICLE PASSENGER CONSTRAINER

TECHNICAL FIELD

The present invention relates to a gas generator for actuating vehicle occupant restraint devices such as pretensioner belts.

BACKGROUND ART

A pretensioner belt is a vehicle occupant restraint device for detecting collision and subsequently tightening a seat belt. For tightening seat belts, there has been normally employed a mechanism of tightening seat belts by gas pressure of a gas generator.

Such gas generator includes a first hollow body with a bottom and sides, gas generants filled in the first hollow body, an electric ignitor, and a holder. The electric ignitor is formed with a second hollow body with a bottom and sides, igniting agents housed in the second hollow body, and a plug closing an opening portion of the second hollow body. The holder positions the second hollow body in the center of the first hollow body, holding the plug of the electrical ignitor. The holder fixes the second hollow body in the first hollow body, closing the opening portion of the first hollow body.

In this kind of as generator, two parts are prepared. One is a first hollow body filled with gas generants. The other is an electric ignitor fixed to a holder and shaped so as to project from the holder. It is difficult to put the holder into the first hollow body without leaving an excessive empty space because of the cylindrical configuration of the was generator.

Therefore, when the electric ignitor is actuated and the gas generants are ignited, increase in inner pressure by ignition in the first hollow body is slowed because of the excessive empty space in the first hollow body. As a result, a rupture of a rupture member of the first hollow body is delayed and there is an adverse possibility that desired performance cannot be obtained.

Generally, a permissible ignition delay period (the period of time between a start of current flow to the electric ignitor and a start of discharging gas from the gas generator) is within 2 ms for the seat belt pretensioners of automobiles. When the ignition delay period is more than 2 ms, an occupant restraint performance cannot be shown sufficiently.

when excessive empty space exists, a size of a gas generator is extended by the empty space. Further, because the gas generants are not fixed, powdering thereof by vibration of a vehicle is also concerned. When such a powdering phenomenon occurs, a combustion velocity of the gas generants becomes extremely fast, and then the gas generator may possibly be damaged.

Hence, Japanese Patent Application Laid-Open No. Hei 8-207694 has disclosed a cup-shaped filling cylinder for filling gas generants without leaving an empty space. The second hollow body of the electric ignitor projects inwardly from the bottom of the cup-shaped filling cylinder. The cup-shaped filling cylinder opens upwardly from the second hollow body of the electric ignitor.

First, in the gas generators having the above-mentioned cup-shaped filling cylinder, the gas generants are filled in the cup-shaped filling cylinder thereof without leaving an empty space. Then, the first hollow body is put on the cup-shaped filling cylinder to cover the opening portion of the cup-shaped filling cylinder. When the gas generants are filled in the first hollow body in this way, it is possible to fix the second hollow body of the electric ignitor in the first hollow body without forming an excessive empty space therein.

However, a filling cylinder needs to be newly provided in this case. As a result, in addition to an increase in the number of components, simplification of the manufacturing process cannot be expected.

It is an object of the present invention to provide a gas generator for actuating vehicle occupant restraint devices having a small number of components and excellent ignitability, and being capable of miniaturization.

SUMMARY OF THE INVENTION

As a result of eager investigation of the present inventors to solve the above-mentioned problem, the present inventors have found that it is important to regulate a ratio of an empty space to an inner volume of the first hollow body to achieve the present invention.

The present invention relates to a gas generator for actuating a vehicle occupant restraint device comprising a first hollow body with an end and a side wall, gas generants densely filled in the first hollow-body, an electric ignitor formed by housing igniting agents in a second hollow body with an end and a side wall then closing the second hollow body with a plug, and a holder positioning the second hollow body in the center of the first hollow body while fixing the first hollow body and holding the plug of the electric ignitor.

In a first gas generator of the present invention, a ratio of an empty space to a volume of a space partitioned by an inner surface of the first hollow body, an outer surface of the second hollow body and the holder (hereinafter it is described as full volume) is less than 20% by volume. The empty space and the ratio of the empty space by volume are calculated by using $$\text{empty space} = \text{full volume} - \text{filling volume} \quad (1)$$

$$\text{ratio of an empty space by volume} = (\text{empty space volume}/\text{full volume}) \times 100 \quad (2)$$

Fundamentally, a space that exists among the particles of filled gas generant compositions is not regarded as a gap. And the filling volume means a necessary volume for gas generants filled in a dense state to substantially exist in the full volume.

According to the first gas generator of the present invention, because the ratio of the empty space to the full volume of the first hollow body is less than 20%, the first hollow body is substantially full of the gas generants. Therefore, ignition energy of the electric ignitor is transmitted efficiently and the time for raising for inner pressure of the first hollow body is shortened.

Accordingly, in the case an electrical ignitor with small ignition power is used, there is no possibility that an ignition delay occurs. In addition, because the first hollow body is substantially full of the gas generants, the gas generants are prevented from being powdered by vibration of vehicles. To ensure the above-mentioned action, it is preferable that the ratio of empty space is less than 15%, further preferably, less than 10%.

The conventional cup-shaped filling cylinder is not necessary, thereby providing reduction of the number of components.

A second gas generator of the present invention is characterized in that the gas generants are powdery or granulated and filled in a compressed state, in addition to the above-mentioned characteristics of the first gas generator. As examples of compressible gas generants, there are powdery or granulated non-azide gas generants, propellant gas generants and the like.

According to the second gas generator of the present invention, the gas generants are powdery or granulated. Therefore, the gas generants can be filled without leaving space and a ratio of the empty space can be easily predetermined. Because the gas generants are filled in a compressed state, the filling density is heightened and the gas generator is miniaturized. Combustion velocity can be adjusted by adjusting a filling weight and a compression height (i.e. a height of a surface formed with the filled agents). It is preferable that the average particle size of material of the powdery or granulated gas generants is adjusted so as to fall into the range of 10–300 μm including 10 μm and 300 μm. It is preferable that the compression degree of the gas generants falls into the range of 30–100% including 30% and 100%. The compression degree. of the gas generants is regarded as 100% when the gas generants are compressed with the density equal to the true density.

The powdery or granulated gas generants, adjusted to be in the predetermined range mentioned above, can be hardened into a predetermined form by compression at a predetermined pressure.

A third gas generator of the present invention is characterized in that a part of the full volume is filled with a spacer 7 inserted between an outer surface of the side wall of the second hollow body 4a and an inner surface of the side wall of the first hollow body 2, in addition to the above-mentioned characteristics of the first or the second gas generator.

According to the third gas generator of the present invention, an empty space between the outer surface of the side wall of the second hollow body 4a and the inner surface of the side wall of the first hollow body 2 can be filled with the spacer 7. Therefore, even if a form of the gas generator cannot be modified for reason of a design of a vehicle occupant restraint device, it is possible to lower the ratio of the empty space. As a result, the first hollow body 2 is substantially full of the gas generants 6, thereby an excellent ignitability is obtained.

An empty space in this gas generator is calculated by using empty space=full volume−(filling volume+volume of a spacer)  (1')

Further, when the length of the spacer is adjusted according to the lengths of the first hollow body and the second hollow body, it is possible to adjust the full length of the gas generator without eliminating an excellent ignitability.

Particularly, a configuration where the spacer is located around the electric ignitor, is desirable. The electric ignitor may be formed so as to include the spacer depending on circumstances. Thereby, ignition energy is concentrated on the gas generants, and the ignitability is maintained. The spacer remains fixed on the electric ignitor after the gas generator is actuated.

Rigid material is desirable for the spacer. For example, the spacer is made of aluminum, plastic, glass fiber, and the like and formed into a doughnut shape, a mesh shape, and the like. When the spacer is made of a gas generant composition with the same form as mentioned above, it is possible to increase the output of the gas generator.

A fourth gas generator of the present invention is characterized in that the gas generants are compressed in advance and filled in the first hollow body so that a concavity, in at which the second hollow body is inserted, is formed, in addition to the above-mentioned characteristics of the first or the second gas generator.

According to the fourth gas generator of the present invention, the gas generants are compressed in the first hollow body in advance so that the concavity, in which the second hollow body is inserted, is formed. Therefore, when the second hollow body is inserted into the first hollow body, the second hollow body is surrounded by the gas generants. The ignition energy of the electric ignitor is transmitted to the gas generants surrounding the second hollow body without waste. Therefore, there is no possibility that an ignition delay occurs. For compressing the gas generants into a concave shape in the first hollow body, convex compressing tools may be used.

A fifth generator of the present invention is characterized in that gas generants that are incompressible or hard to compress are filled densely in the first hollow body and a part of the full volume is filled with the spacer inserted between the outer surface of the side wall of the second hollow body and the inner surfaces surface of the side wall of the first hollow body, in addition to the above-mentioned characteristics of the first gas generator.

In the gas generator of the present invention described above, the excessive empty space in the first hollow body can be reduced, thereby reducing an ignition delay of the gas generator. Further, the gas generants are prevented from being powdered by vibration of vehicles. Thus, the gas generator of the present invention is excellent in ignitability and reduced in size though it is manufactured in a manufacturing process almost the same with the conventional one.

BRIEF DESCRIPTION OF THE DRAWINGS

FIG. 3 shows the relationship of the ratio of the empty space by volume and ignition delay period of the gas generator.

BEST MODE FOR CARRYING OUT THE INVENTION

The embodiments of the present invention will be described below with reference to the drawings.

Figure 1:
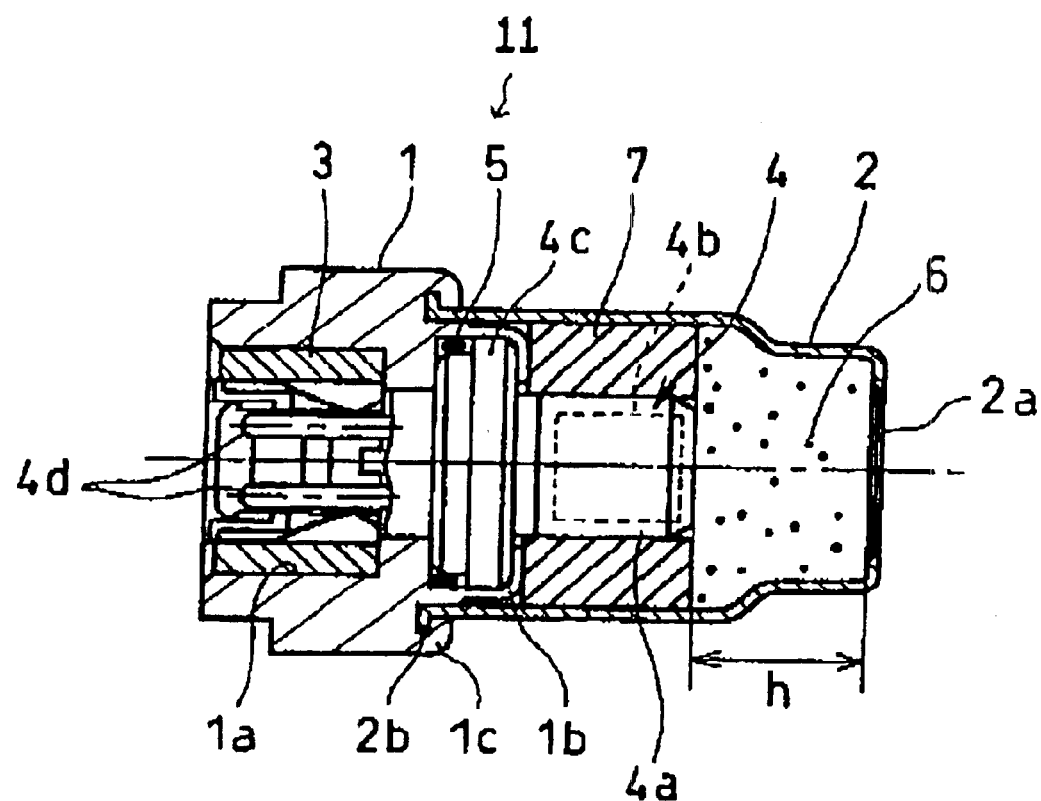
FIG. 1 is a sectional view of the first embodiment of the present invention.

In FIG. 1 a gas generator 11 includes a first hollow body 2 with an end and a side wall, gas generants 6 filled in the first hollow body 2, an electric ignitor 4, a holder 1, and a spacer 7.

In FIG. 1 a gas generator 11 includes a first hollow body 2 with a bottom and sides, gas generants 6 filled in the first hollow body 2, an electric ignitor 4, a holder 1, and a spacer 7.

An end of the first hollow body 2 is provided with a rupture portion 2a thin in wall thickness. The first hollow body 2 is press-formed so as to have two sections consisting of a small diametral portion on an end side and a large diametral portion which is a main portion. An end of the main portion is bent to be a flange 2b.

The electric ignitor 4 has a second hollow body 4a with an end and side wall, igniting agents 4b housed in the second hollow body 4a, a plug 4c to close an opening portion of the second hollow body 4a, and two pins 4d standing on the plug 4c. The two pins 4d are connected to a bridge wire (not shown) being in contact with the igniting agents 4b.

The holder 1 fixes the first hollow body 2 positioning the second hollow body 4a in the center of the first hollow body 2. Further, the holder 1 supports the plug 4c by a caulking portion 1b with an O-like ring 5 around an outer circumference of the plug 4c. The O-like ring 5 is employed for use in sealing. The holder 1 projects a part of the second hollow body 4a of the electric ignitor 4 into the first hollow body 2, and allows parts of the pins 4d to be connected to a connector (not shown).

An insulation ring 3 is fitted to a hole 1a in back of the holder 1 to ensure insulation. The caulking portion 1b for supporting the plug 4c is inserted in the opening portion of the first hollow body 2. By the caulking portion 1c of the holder 1 on the flange 2b of the first hollow body 2, the first hollow body 2 is fixed on the holder 1 in a sealed condition.

A space partitioned by an inner surface of the first hollow body 2, an outer surface of the second hollow body 4a and the holder 1 is capable of housing gas generants. The gas generants 6 and the spacer 7 are located in this space.

The spacer 7 is, for example, in a cylindrical shape, where a diameter of the inner circumference thereof is substantially the same as the diameter of the outer circumference of the second hollow body 4a and a diameter of the outer circumference thereof is substantially the same as the diameter of the inner circumference of the main portion of the first hollow body 2. The spacer 7 is inserted between the outer surface of the side wall of the second hollow body 4a and the inner surface of the side wall of the first hollow body 2.

A length of the cylindrical spacer 7 is determined so that the later-described ratio of the empty space by volume is less than 20%, in consideration of the later-described filling volume of the gas generants.

In the case that the gas generants 6 are incompressible or hard to compress e.g. smokeless powder or press-formed non azide gas generants, the gas generants are densely filled in the first hollow body 2 on the end side thereof. In the case that the gas generants 6 are compressible and powdery or granulated, the gas generants are densely filled in the first hollow body 2 on the end side thereof in a condition hardened by a compression. The dimension h in the drawing refers to a distance between the bottom of the first hollow body 2 and the filling surface (i.e. the surface formed with filled agents).

It is possible to increase a weight of the gas generants 6 by shortening the length of the spacer 7. Further, when the spacer 7 is made of a gas generant composition, a space for housing the gas generants of the first hollow body 2 is not wasted and the amount of generated gas can be increased.

The volume of a space, which is partitioned by an inner surface of the first hollow body 2, an outer surface of the second hollow body 4a and the holder 1 and capable of housing the gas generants, constitutes a full volume.

According to the present invention, a volume and a form of the spacer 7 and a filling volume of gas generants are determined so that the ratio of an empty space, which is not filled with the spacer 7 and the gas generants, to the full volume is less than 20% by volume, preferably less than 10%.

Fundamentally, a space that exists among the particles of filled gas generant compositions is not regarded as a gap. And the filling volume means a necessary volume for gas generants filled in a dense state to substantially exist in the full volume.

Specifically, the filling volume of the gas generants filled in the first hollow body 2 on the end side thereof, shown in FIG. 1, is calculated in consideration of a distance h between the end of the first hollow body 2 and the filling surface (i.e. a surface formed with the filled agents), an inner diameter of the first hollow body 2, and an outer diameter of the second hollow body 4a.

A volume of the empty.space and the ratio thereof are calculated by using $$\text{volume of an empty space} = \text{full volume} - (\text{filling volume} + \text{volume of a spacer}) \quad (1')$$

$$\text{ratio of an empty space by volume} = (\text{empty space volume}/\text{fall volume}) \times 100 \quad (2)$$

In the gas generator where the gas generants 6 and the spacer 7 are located, it is possible that the ratio of the empty space to the full volume is less than 20%, further, less than 10%. The full volume is a volume of the space partitioned by the inner surface of the first hollow body 2, the outer surface of the second hollow body 4a and the holder 1.

Particularly, in the case that the gas generants are incompressible or hard to compress e.g. smokeless powder or press-formed non azide gas generants, the gas generants cannot be hardened into a predetermined shape by a compression so as to fit a space for housing the gas generants of the gas generator. Therefore, it is preferable to use the spacer so as not to form an excessive empty space.

The above-mentioned gas generator is manufactured by the following steps. In the case that the gas generants are incompressible or hard to compress e.g. smokeless powder or press-formed non azide gas generants, the gas generants are densely filled in the first hollow body 2 on the end side thereof. In the case that the gas generants 6 are compressible and powdery or granulated, the gas generants are densely filled in the first hollow body 2 on the end side thereof in the state hardened by compression.

The electric ignitor 4 is supported by the holder 1 and the spacer 7 is fitted around the outer circumference of the second hollow body 4a of the electric ignitor 4. Then, the holder 1 is fitted to the first hollow body 2 and fixed by the caulking portion 1c. Thus, the gas generator of which inner space is regulated, is manufactured in a process almost the same with the conventional one.

Figure 2:
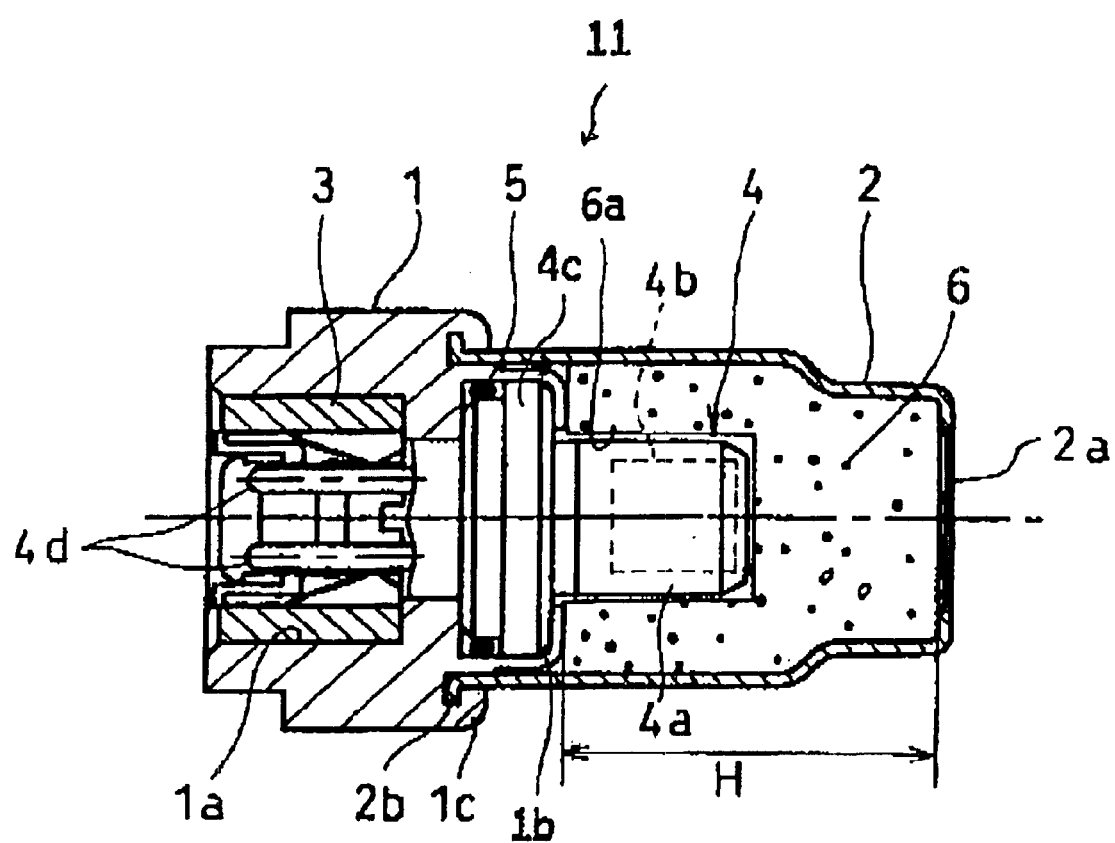
FIG. 2 is a sectional view of the second embodiment of the present invention.

FIG. 2 shows a gas generator without a spacer, in which the gas generants 6 are compressed to be concave to fit the second hollow body 4a. The gas generants 6, which are powdery or granulated and compressible, are suitable. The portions functioning the same way with those of FIG. 1 are referred to by the same reference numerals and the description is omitted.

The gas generants 6, which are compressible and powdery or granulated, are densely filled in the first hollow body 2 on the end side thereof in the state hardened by a compression to have a concavity 6a to which the second hollow body 4a of the electric ignitor 4 is just fitted. The dimension H in the drawing refers to a distance between the bottom of the first hollow body 2 and the filling surface (i.e. a surface formed with the filled agents).

In the embodiments of the present invention, a filling volume of the gas generants 6 is determined so that the ratio of an empty space, which is not filled with the gas generants 6, to the full volume is less than 20% by volume, preferably less than 10%.

In the case that the gas generants 6 are compressed in the first hollow body 2 in advance to be concave to fit the second hollow body 4a as described above, the second hollow body 4a is surrounded by the gas generants simply by inserting the second hollow body 4a in the first hollow body 2 and fixing by the caulking portion 1c of the holder 1. Therefore, the inner empty space of the gas generator is reduced compared to the conventional one.

The degree of compression of the gas generants is regarded as 100% when the gas generants are compressed to a density equal to a true density thereof. In the gas generator of the present invention the degree of compression preferably falls in a range of 30–100%, including 30% and 100%, so that the gas generants can be compressed into a predetermined form. Concretely, the compression degree is calculated by using compression degree [%]=(weight of gas generants per 1 cm³ of a filling volume/true density of gas generants)×100

In the following, the examples of the present invention will be described in detail. All members included in the gas generators employed in the following examples and comparative examples, such as electric ignitors, O-like rings or holders, are of the same standard or type.

EXAMPLE 1

In the gas generator shown in FIG. 2, the gas generants containing 33.8% by weight of 5-aminotetrazole, 30.5% by weight of ammonium perchlorate, 31.0% by weight of strontium nitrate, and 4.7% by weight of synthetic hydrotalcite were employed. The true density was 2.18 g/cm³. The gas generants were powdery, o with a particle mean diameter of 50 μm, and compressible.

Gas generants weighing 1.9 g were weighed and filled in the first hollow body. Then, the gas generants were compressed for forming a concavity until the filling volume was 2.11 cm³. The full volume of the gas generator is 2.3 cm³. The empty space calculated by the equation is 0.19 cm³ and the ratio is 8.3% by volume. The weight of the gas generants per 1 cm³ of the filling volume is 0.9 g and the compression degree is 41.3%.

FIG. 3 shows the ratio of the empty space by volume and ignition delay of the gas generator obtained in Example 1.

EXAMPLE 2

In the gas generator shown in FIG. 2, the same gas generants as those used in the Example 1 were employed. The true density was 2.18 g/cm³. The gas generants were powdery, with a particle mean diameter of 50 μm, and compressible.

Gas generants weighing 1.7 g were weighed and filled in the first hollow body. Then, the gas generants were compressed for forming a concavity until the filling. volume was 1.89 cm³. The full volume of the gas generator is 2.3 cm³. The empty space calculated by the equation is 40.41 cm³ and the ratio is 17.8% by volume. The weight of he gas generants per 1 cm³ of the filling volume is 0.9 g and the compression degree is 41.3%.

FIG. 3 shows the ratio of the empty space by volume and ignition delay period of the gas generator obtained in Example 2.

EXAMPLE 3

In the gas generator shown in FIG. 1, the spacer of 0.4 cm³ volume was fixed around the second hollow body of the electric ignitor.

The same gas generants as those used in the Example 1 were employed. The true density was 2.18 g/cm³. The gas generants were powdery, which with a particle mean diameter of 50 μm, and compressible. Gas generants weighing 1.5 g were weighed and filled in the first hollow body. Then, the gas generants were compressed until the filling volume was 1.67 cm³. The full volume of the gas generator is 2.3 cm³. The empty space calculated by the equation is 0.23 cm³ and the ratio is 10.0% by volume. The weight of the gas generants per 1 cm³ of the filling volume is 0.9 g and the compression degree is 41.3%.

FIG. 3 shows the ratio of the empty space by volume and ignition delay period of the gas generator obtained in Example 3.

EXAMPLE 4

In the gas generator shown in FIG. 1, the spacer of 0.4 cm³ volume was fixed around the second hollow body of the electric ignitor.

The gas generants containing 98.0% by weight of nitrocellulose, 1.0% by weight of diphenylamine, and 1.0% by weight of potassium sulfate were employed. The gas generants were incompressible, with particles press-formed into a cylindrical shape having an outer diameter of 0.7 mm, an inner diameter of 0.2 mm; and a height of 1.3 mm.

Gas generants weighing 1.3 g were weighed and filled in the first hollow body. Then the gas generants were filled densely without compression until the filling volume was 1.73 cm³. The full volume of the gas generator is 2.3 cm³. The empty space calculated by the equation is 0.17 and the ratio is 7.4% by volume. The weight of the gas generants per 1 cm³ of the filling volume is 0.75 g.

FIG. 3 shows the ratio of the empty space by volume and ignition delay period of the gas generator obtained in Example 4.

Comparative Example 1

The gas generator in the Comparative Example 1 is equivalent to the gas generator shown in FIG. 1 except the spacer is not included, and the ratio of the empty space by volume is no less than 20%.

The same gas generants as those used in the Example 1 were employed. The true density was 2.18 g/cm³. The gas generants were powdery, with a particle mean diameter of 50 μm, and compressible.

Gas generants weighing 1.5 g were weighed and filled in the first hollow body. Then, the gas generants were compressed until the filling volume was 1.67 cm³. The full volume of the gas generator is 2.3 cm³. The empty space calculated by the equation is 0.63 cm³ and the ratio is 27.4% by volume. The weight of the gas generants per 1 cm³ of the filling volume is 0.9 g and the compression degree is 41.3%.

FIG. 3 shows the ratio of the empty space by volume and ignition delay period of the gas generator obtained in Comparative Example 1.

Generally, a permissible ignition delay period in seat belt pretensioners for automobiles is within 2 ms. When a delay more than 2 ms occurs, an occupant restraint performance cannot be shown sufficiently.

According to FIG. 3. the ignition delay periods in Examples 1, 2, 3, 4 are short being less than 2 ms. The ignition delay period in Comparative Example 1 is substantially longer than 2 ms compared to those in Examples 1–4. Accordingly, it is shown that the ratio of the excessive space i.e., the empty space in the first hollow body causes a considerable ignition delay of the gas generator.

INDUSTRIAL APPLICABILITY

The gas generator of the present invention is most suitable for actuating vehicle occupant restraint device, particularly, for a gas generator with a small component count, excellent in ignitability, and capable of being miniaturized.

What is claimed is:

1. A gas generator for actuating a vehicle occupant restraint device comprising:

a first hollow body with an end and a side wall;

gas generants filled densely in the first hollow body;

an electric ignitor formed by housing igniting agents in a second hollow body with an end and a side wall, and closing the second hollow body with a plug; and a holder positioning the second hollow body in a center of the first hollow body and fixed to the first hollow body while holding the plug of the electric ignitor, wherein a ratio of an empty volume to a volume defined by an inner surface of the first hollow body, an outer surface of the second hollow body, and the holder is less than 20%, a part of a volume is filled with a spacer inserted between the outer surface of the second hollow body and the inner surface of the first hollow body, and said spacer is made of a gas generant composition.

2. The gas generator for actuating a vehicle occupant restraint device according to claim 1, wherein the gas generants are powdery or granulated, and filled in a compressed state.

3. The gas generator for actuating a vehicle occupant restraint device according to claim 1, wherein the gas generants are substantially incompressible.

4. The gas generator for actuating a vehicle occupant restraint device according to claim 1, wherein said volume ratio is less than 15%.

5. The gas generator for actuating a vehicle occupant restraint device according to claim 4, wherein said volume ratio is less than 10%.

\* \* \* \* \*